United States Patent
Schroeder

(10) Patent No.: US 6,769,562 B2
(45) Date of Patent: Aug. 3, 2004

(54) RECEPTACLE SLEEVE

(75) Inventor: Edward Schroeder, Marengo, IL (US)

(73) Assignee: Porter Athletic Equipment Co., Broadview, IL (US)

( * ) Notice: Subject to any disclaimer, the term of this patent is extended or adjusted under 35 U.S.C. 154(b) by 0 days.

(21) Appl. No.: 10/184,399

(22) Filed: Jun. 27, 2002

(65) Prior Publication Data

US 2004/0000555 A1 Jan. 1, 2004

(51) Int. Cl.[7] ............................................. H02G 3/12
(52) U.S. Cl. ........................ 220/3.5; 174/50; 220/477
(58) Field of Search .................... 220/3.6, 3.5, 3.3, 220/4.03, 241, 3.92, 3.94, 477; 174/48, 58, 66, 50; 248/27.1, 906; 439/538, 535, 536, 537; 52/407.2, 510, 507

(56) References Cited

U.S. PATENT DOCUMENTS

| | | | | |
|---|---|---|---|---|
| 1,490,252 A | * | 4/1924 | Bissell | ..................... 220/3.6 |
| 4,444,369 A | * | 4/1984 | Job | ........................... 248/27.1 |
| 4,892,212 A | * | 1/1990 | Andreyko | .................... 220/3.3 |
| 5,158,478 A | * | 10/1992 | Schuplin | ..................... 439/538 |
| 5,555,989 A | * | 9/1996 | Moran, Jr. | .................. 220/62 |
| 5,680,947 A | * | 10/1997 | Jorgensen | .................. 220/3.9 |
| 6,103,972 A | * | 8/2000 | Hagarty | ...................... 174/53 |
| 6,180,879 B1 | * | 1/2001 | Gretz | .......................... 174/50 |

* cited by examiner

*Primary Examiner*—Stephen K. Cronin
*Assistant Examiner*—Joseph C. Merek

(57) ABSTRACT

The present invention concerns a receptacle sleeve for use with a padded wall. The device includes a base having opposingly located walls which define an opening. A first edge and a second edge is also located on the walls. A lip is attached to the first edge and circumscribes the base. The device also includes a moveable anchor that may have at least one fold line. The anchor is attached to one or more walls at the second edge. The lip, wall, and anchor combine to create at least one channel for securing the receptacle to a padded wall.

6 Claims, 3 Drawing Sheets

RECEPTACLE SLEEVE

BACKGROUND OF THE INVENTION

The present invention relates to a receptacle sleeve. More specifically, the present invention relates to a receptacle sleeve that fits within an opening in a padded wall and the like.

SUMMARY OF THE INVENTION

Padded walls are often attached to pre-existing walls in gymnasiums and the like for protection purposes. Often, the wall that is to be covered includes electrical outlets and the like which cannot be obstructed by the padding. To maintain access, openings are typically made in the padding. However, simply making unfinished openings is typically not acceptable. For example, such openings may not have a finished look, and may also present rough edges that require a second covering. Over time, the cut material may loosen and result in tears or seperation of the covering from the padded material. In general use, the thickness of the padding may vary. This, in turn, requires flexibility in any device used in the opening.

The present invention provides a receptacle sleeve which may be used in the openings made in padded walls to provide a safe, finished look. The present invention is also capable of being used with materials of various thicknesses. The present invention is a receptacle sleeve that includes a base which defines an opening. A lip circumscribes the base and a moveable anchor is opposingly located from the lip and attached to the base. The base, lip, and anchor form a channel which secures the receptacle to the padded wall.

DESCRIPTION OF THE DRAWINGS

These and other features, objects and advantages of the present invention will become apparent from the following description and drawings wherein like reference numerals represent like elements in several views, and in which.

DESCRIPTION OF THE PREFERRED EMBODIMENT

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
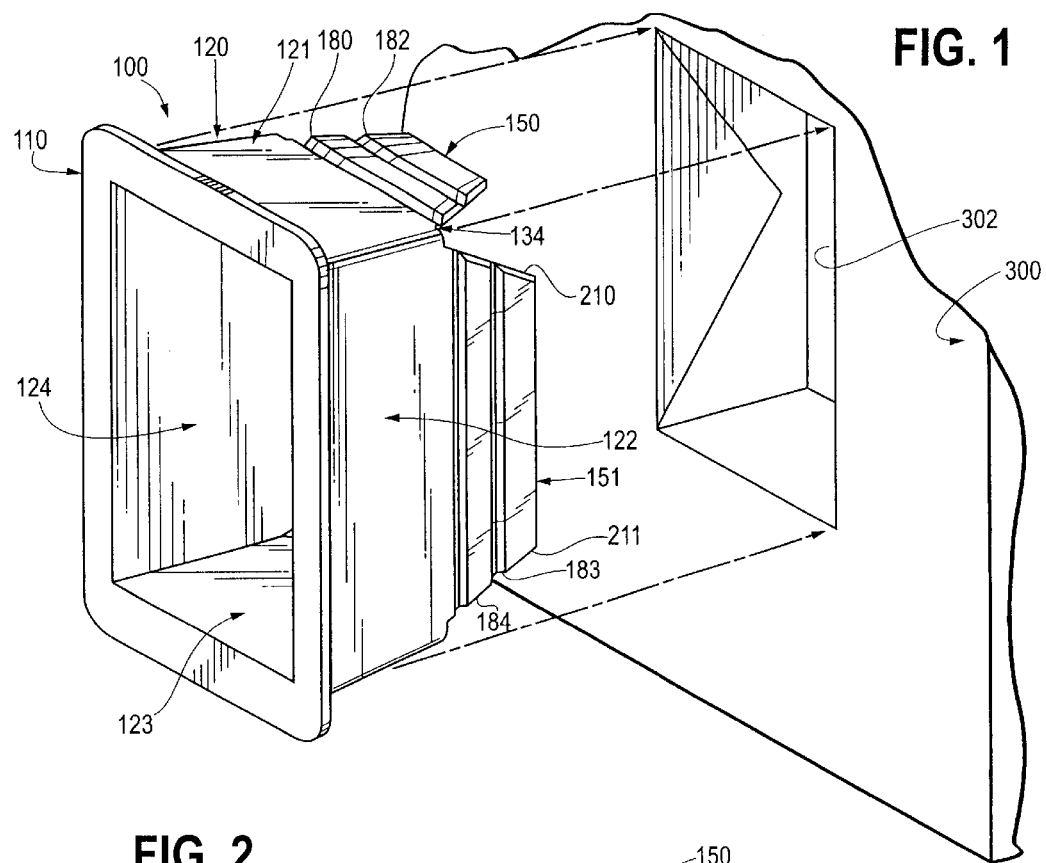
FIG. 1 is a perspective view showing how one embodiment of the present invention may be installed inside a padded wall.
Figure 2:
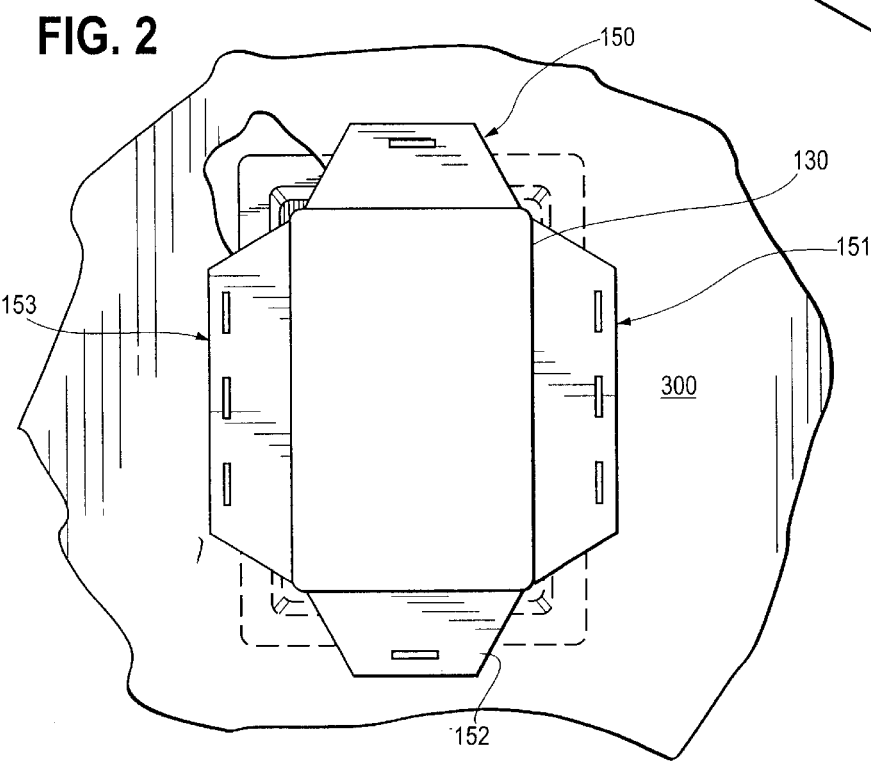
FIG. 2 is a back view of one embodiment of the present invention.
Figure 7:
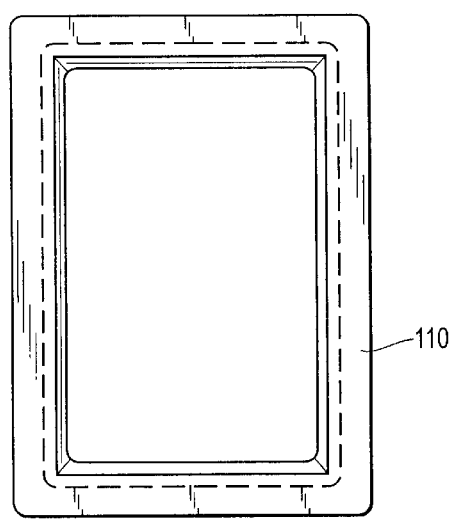
FIG. 7 is a front view of the present invention used in a two gang application.
Figure 8:
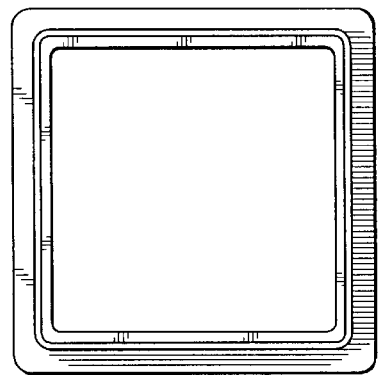
FIG. 8 is a front view of the present invention used in a four gang application.

As shown in FIGS. 1 and 2, the present invention comprises a receptacle sleeve 100 which includes a lip 110 which may circumscribe a base 120. Base 120 may be a continuous wall that defines an opening 130. Base 120 may also include four walls 121–124 which may be arranged in a rectangular or square shape as shown in FIGS. 1, 7, and 8. Of course, other shapes such as circular, oblong or hexagonal may be used as well. Rectangular shapes are typically used in single and multiple gang applications and square shapes are typically used with double gang applications.

Figure 3:
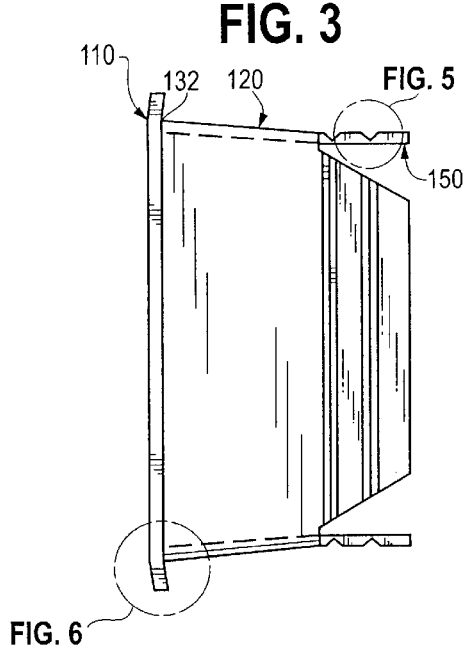
FIG. 3 is a side view of one embodiment of the present invention.
Figure 4:
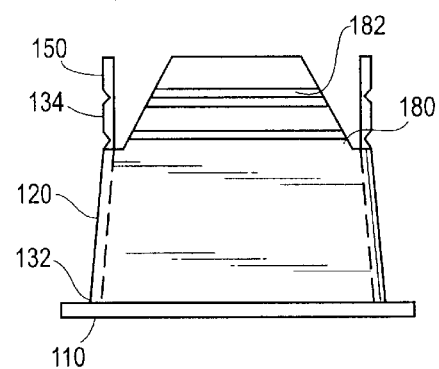
FIG. 4 is a top view of one embodiment of the present invention.
Figure 6:
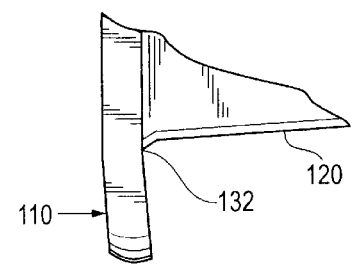
FIG. 6 illustrates how a lip used with one embodiment of the present invention may form an acute angle with the base.

As shown in FIGS. 3, 4, and 6, lip 110 is attached to base 120 at a first edge 132. The angle of attachment between the base and lip may be acute so as to promote a tight fit with the padding material 300. A second edge 134 is also provided to which an anchor 150 is attached.

Figure 11:
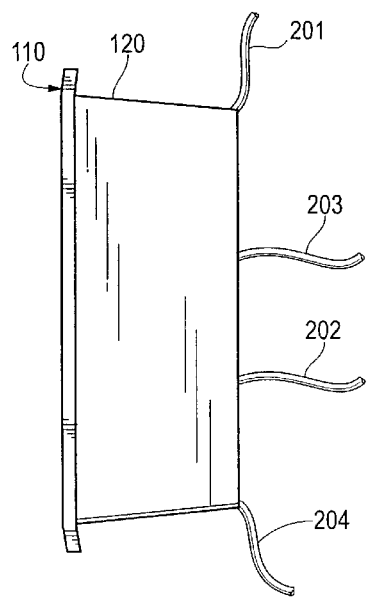
FIG. 11 is a side view of the embodiment shown in FIG. 9.
Figure 12:
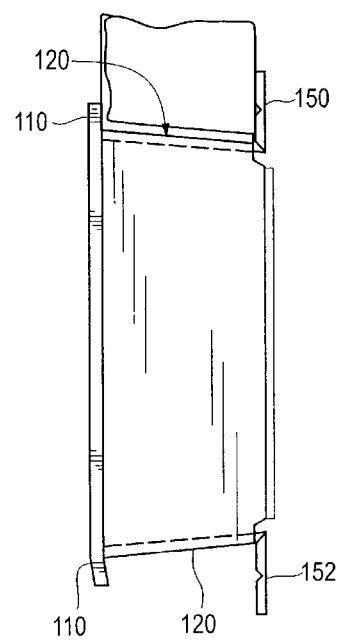
FIG. 12 is a side view of the embodiment shown in FIG. 2.

Anchor 150 is moveable between a first position which may be in alignment with base 120 (as shown in FIG. 1) to an upright or second position (as shown in FIGS. 1–3 and 11). In the second position, the anchor is substantially parallel to the lip and approximately perpendicular to base 120. This results in the anchor, lip and base forming at least one channel 160 that allows the receptacle to be retained inside a padded wall as shown in FIG. 12.

Figure 9:
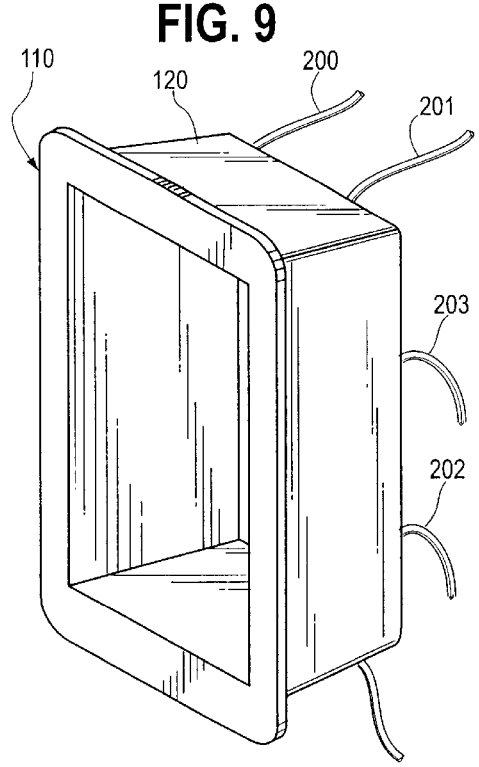
FIG. 9 shows another embodiment of the present invention using at least one strap as an anchor.
Figure 10:
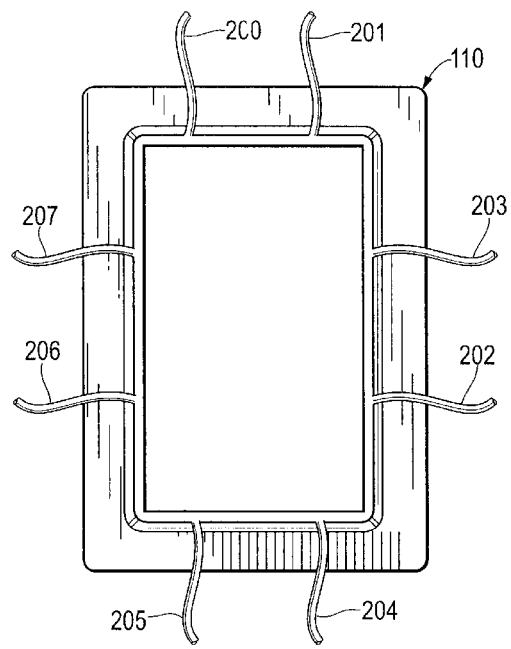
FIG. 10 is a back view of the embodiment shown in FIG. 9.

In another embodiment, multiple anchors 150–153 may be used. While the anchors in this embodiment are shown as flaps that are in the shape of a trapezoid so as to have angled side walls 210 and 211, other shapes and anchoring means may be used as well. For example, triangular, semi-circular, and rectangular shapes may be used. In addition, the anchoring means may be in the form of flexible straps 200–207 as shown in FIGS. 9–11.

Figure 5:
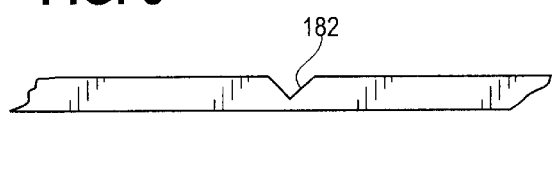
FIG. 5 illustrates how a groove may be made in an anchor used in one embodiment of the present invention.

To accommodate padded walls of varying thicknesses, the distance between the anchor, when in its second position, and the lip needs to be changeable. This is accomplished through the use of the flexible straps or making multiple fold lines in each of the flaps. Although applicable to all of the flaps, grooves or scored lines may be made in flap 150. As shown, a first fold line 180 is formed and a second fold line 182 is formed. Additional fold lines may be made as well. In a preferred embodiment, the groove is 90 degrees as shown in FIG. 5.

In use, to install receptacle 100, an opening 302 is first made in padding 300 as shown in FIG. 1. The site of opening 302 should be approximately the size of receptacle 100 or slightly larger. Once opening 302 is formed, receptacle 100 is inserted. For ease of insertion, the walls of the base are tapered downwardly from the lip to the anchors. In addition, if flaps are used as the anchoring means instead of straps, they should be in their first position. Once the lip engages the front surface of the padding 300, flaps 150–153 are placed into the second position by folding at the appropriate location. By placing anchors in the second position, the lip, base and anchor will generally be in a flush engagement with the opening 302 as a result of the channel-like configuration created.

To retain the receptacle to the padding material, the anchors are affixed to the back side of the pad by fasteners, adhesive, staples and in other ways known to those of skill in the art. At the same time, lip 110 is maintained in a flush engagement with the front side of the pad.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A receptacle sleeve for use with a padding material, said sleeve comprising:

a base having two opposing end walls and two opposing side walls, said side walls being connected to said end walls at respective corners, said base having a proximal end with an opening and an opposed distal end with an opening, said proximal end having a lip extending outwardly from each of said end walls and said side walls, said distal end having an anchor connected to each of said end walls and said side walls, wherein each said anchor includes a flap, each flap having angled side walls forming a trapezoidal shape, each of said flaps having a plurality of fold lines, wherein said flaps are moveable about said fold lines.

2. The receptacle sleeve of 1 wherein said openings are square-shaped.

3. The receptacle sleeve of claim 1 wherein said openings are rectangular.

4. The receptacle sleeve of claim 1 wherein each fold line is a groove.

5. The receptacle sleeve of claim 1 wherein the plurality of fold lines lie in spaced parallel relation.

6. The receptacle sleeve of claim 1 wherein said lip forms an acute angle with said side walls and said end walls.

\* \* \* \* \*